United States Patent
Yadlowsky

(10) Patent No.: US 10,148,348 B2
(45) Date of Patent: Dec. 4, 2018

(54) OPTICAL-ELECTRICAL INTERFACE DEVICES AND SYSTEMS WITH OPTICAL COMMUNICATION PATHWAY REDUNDANCY

(71) Applicant: Corning Optical Communications LLC, Hickory, NC (US)

(72) Inventor: Michael John Yadlowsky, Sunnyvale, CA (US)

(73) Assignee: Corning Optical Communications LLC, Hickory, NC (US)

( * ) Notice: Subject to any disclaimer, the term of this patent is extended or adjusted under 35 U.S.C. 154(b) by 169 days.

(21) Appl. No.: 15/206,846

(22) Filed: Jul. 11, 2016

(65) Prior Publication Data
US 2017/0019166 A1    Jan. 19, 2017

Related U.S. Application Data

(60) Provisional application No. 62/193,709, filed on Jul. 17, 2015.

(51) Int. Cl.

| | |
|---|---|
| *H04B 10/03* | (2013.01) |
| *H04B 10/25* | (2013.01) |
| *H04Q 11/00* | (2006.01) |
| *H04B 10/032* | (2013.01) |
| *H04B 10/40* | (2013.01) |

(52) U.S. Cl.
CPC ........... *H04B 10/03* (2013.01); *H04B 10/032* (2013.01); *H04B 10/2504* (2013.01); *H04B 10/40* (2013.01); *H04Q 11/0062* (2013.01); *H04Q 2011/0081* (2013.01); *H04Q 2011/0083* (2013.01)

(58) Field of Classification Search
CPC ............. H04B 10/032; H04B 10/0775; H04Q 2011/0081; H04Q 11/0067; H04Q 11/0066; H04Q 2011/0015; H04Q 2011/0083
See application file for complete search history.

(56) References Cited

U.S. PATENT DOCUMENTS

| | | |
|---|---|---|
| 5,136,410 A | 8/1992 | Heiling et al. |
| 5,809,220 A | 9/1998 | Morrison et al. |

(Continued)

FOREIGN PATENT DOCUMENTS

| | | |
|---|---|---|
| CN | 103434461 A | 12/2013 |
| JP | 03834105 B2 | 10/2006 |

*Primary Examiner* — David Payne
*Assistant Examiner* — Tanya Motsinger
(74) *Attorney, Agent, or Firm* — Michael E. Carroll, Jr.

(57) ABSTRACT

Electrical-optical interface devices and methods for use in optical communications systems are disclosed. The electrical-optical interface devices are configured to convert electrical signals to optical signals and optical signals to electrical signals, and are configured to connect to external devices. The electrical-optical interface device is configured to monitor the data transmission between external devices over a primary communication pathway. The electrical-optical interface device is designed to reconfigure itself when it receives information about a communication error so that it automatically utilizes secondary optical communication pathways as redundant optical communication pathways to maintain data communication between the external devices.

25 Claims, 8 Drawing Sheets

(56) References Cited

U.S. PATENT DOCUMENTS

| | | | |
|---|---|---|---|
| 6,172,782 B1* | 1/2001 | Kobayashi | H04J 14/02 370/219 |
| 6,288,809 B1* | 9/2001 | Touma | H04J 3/1694 398/9 |
| 6,316,762 B1* | 11/2001 | Argast | G01J 4/04 250/214 R |
| 6,385,561 B1* | 5/2002 | Soraghan | G01M 11/3136 324/456 |
| 7,865,077 B2* | 1/2011 | Mukojima | H04Q 11/0067 398/1 |
| 8,417,114 B1* | 4/2013 | Storey | H04B 10/0773 398/16 |
| 8,718,087 B1 | 5/2014 | Johnston et al. | |
| 8,953,936 B2* | 2/2015 | Hood | H04B 10/032 398/66 |
| 9,882,633 B2* | 1/2018 | Schmidt | H04B 10/03 |
| 2002/0003639 A1* | 1/2002 | Arecco | H04J 14/022 398/59 |
| 2002/0109875 A1* | 8/2002 | Eijk | H04B 10/032 398/2 |
| 2003/0215235 A1 | 11/2003 | Norizuki et al. | |
| 2005/0063700 A1* | 3/2005 | Shin | H04B 10/0775 398/30 |
| 2005/0213970 A1* | 9/2005 | Kimura | H04J 14/0291 398/45 |
| 2006/0104638 A1* | 5/2006 | Chung | H04J 14/0226 398/71 |
| 2009/0001252 A1* | 1/2009 | Korcharz | G09G 3/3413 250/205 |
| 2009/0175631 A1* | 7/2009 | Ikushima | H04B 10/66 398/210 |
| 2009/0245792 A1* | 10/2009 | Oishi | H04Q 11/0067 398/66 |
| 2010/0002591 A1* | 1/2010 | Mizutani | H04L 43/0852 370/241.1 |
| 2010/0239266 A1* | 9/2010 | Kash | H04Q 11/0005 398/135 |
| 2010/0290780 A1* | 11/2010 | Teipen | H04B 10/27 398/27 |
| 2011/0150477 A1* | 6/2011 | Winzer | H04B 10/6971 398/65 |
| 2011/0188849 A1* | 8/2011 | Haramaty | H04B 17/00 398/25 |
| 2011/0217035 A1* | 9/2011 | Toscano | H04J 3/14 398/5 |
| 2011/0317995 A1* | 12/2011 | Zheng | H04J 14/0282 398/2 |
| 2012/0134664 A1* | 5/2012 | Zheng | H04L 45/22 398/5 |
| 2012/0224494 A1* | 9/2012 | Kataoka | H04L 12/462 370/244 |
| 2014/0119722 A1* | 5/2014 | Ichimura | H04B 10/032 398/16 |
| 2014/0328164 A1* | 11/2014 | Kim | H04L 45/22 370/225 |

* cited by examiner

OPTICAL-ELECTRICAL INTERFACE DEVICES AND SYSTEMS WITH OPTICAL COMMUNICATION PATHWAY REDUNDANCY

CROSS-REFERENCE TO RELATED APPLICATIONS

This application claims the benefit of priority to U.S. Provisional Application No. 62/193,709, filed on Jul. 17, 2015, and is incorporated herein by reference.

FIELD

The present disclosure relates to optical-electrical interface devices, and in particular to such devices and systems having optical communication pathway redundancy that make them operationally robust when used in an optical communication system.

BACKGROUND

Copper-based electrical interconnects are currently used to electrically transmit data for a wide variety of applications, systems and devices. Copper electrical interconnects are low cost and well-accepted over a range of industries, including the automotive and transportation industries. However, there is an increasing demand for the transmission of video and other high-bandwidth data for a variety of applications, including automotive and transportation applications. The use of the video data ranges from entertainment to safety systems, such as collision avoidance detectors and secondary cameras that give a driver or a machine operator important visual information.

The need to transmit video data is challenging due to the limited data carrying capacity of existing copper networks. Copper or all-electronic data transmission systems become bulky and heavy when designed to carry the wide-bandwidth signals needed to achieve high data rate transmission. In addition, latency is critical in safety systems, meaning that most forms of data compression technology cannot be used to achieve the high-data-rate transmission.

Optical-fiber-based transmission systems and interconnects are widely used in applications requiring high data rates, but have not been widely adopted in certain applications, such as automotive and transportation applications, because of handling difficulty and cost. In addition, there are reliability concerns with respect to the light sources (e.g., VCSELs) and the opto-mechanical components. Reliability considerations are especially important in safety systems, and the challenge is compounded in harsh operating environments.

SUMMARY

The disclosure is directed to electrical-optical (E-O) interface devices and methods for use in optical communications systems. The E-O interface devices are configured to convert received optical signals to electrical signals and received electrical signals to transmitted optical signals. The E-O interface devices are configured to be electrically connected to external devices. The E-O interface devices are also adapted to communicate over a primary communication pathway and to reconfigure themselves to automatically switch to a secondary (redundant) optical communication pathway when a communication error relating to the primary communication pathway occurs. The primary communication pathway can include one or more primary optical fibers and the secondary communication pathway can include one ore more secondary optical fibers. Thus, in an example the primary and secondary communication pathways respectively include primary and secondary optical communication pathways.

Redundant communication pathways allow for the continued transmission of data following the failure of system components including the link or cable carrying the signals. To protect against failure of the communication pathway, it is necessary for the redundant or protection signal to be routed along a different path than the primary signal. Similarly, link management messages that include the status of links may follow diverse routes to ensure that they reach their destination in the event of a communication error. There are applications in vehicles and other controlled environment systems where the risk of the optical fiber or cable being disrupted is small and the primary concern is to protect against component failures.

The devices, systems and methods disclosed herein allow for reducing the cost of an optical communication system while continuing to provide protection against the failure of individual components of the system. The optical fibers that constitute the optical link for the system may be in the same cable or may be packaged alternatively, but follow substantially the same route between end points, thereby simplifying the structure of the interconnections and easing installation and routing of the interconnections in the environment where it is deployed. Additionally, the routing of link management information can be simplified if a complete failure of the cable connecting the communicating devices does not need to be protected against.

The systems and methods disclosed herein also provide greater reliability than existing short-reach optical solutions by providing redundant channels or communication pathways that can be used in the event of a communication error cause by the degradation or outright failure of a component such as a light source, a photodetector or optical fiber. The systems and methods can be used with low cost electronic components to monitor the performance of the primary communication pathway and automatically switch to one of the secondary or redundant communication pathways, in many cases without substantially interrupting the high speed data being transmitted across the link. Methods of controlling the system state are also disclosed.

A first aspect of the disclosure is a method of performing data communication between first and second external devices that process electrical signals provided thereto. The method includes: a) optically connecting the first and second external devices to respective first and second electrical-optical (E-O) interface devices, which are optical connected by a primary optical communication pathway and a secondary optical communication pathway that are substantially co-routed; b) communicating between the first and second external devices by sending optical signals between the first and second E-O interface devices in both directions over the primary optical communication pathway only; c) when a communication error occurs, detecting the communication error at one of the first and second E-O interface devices and generating in response a communication error signal; and d) based on the communication error signal, at least one of the first and second E-O interface devices automatically reconfiguring itself so that the some or all of the electrical signal provided to at least one of the first and second external devices are derived from the optical signals transmitted or received over one or more secondary optical communication pathways.

Another aspect of the disclosure is the method described above and further including forming the optical signals first as test signals and then forming the optical signals as data signals.

Another aspect of the disclosure is the method described above and further including detecting the communication error at one of the first and second E-O interface devices and transmitting the communication error signal to the other of the first and second E-O interface devices.

Another aspect of the disclosure is the method described above, wherein the communication error signal is communicated over either at least one: the primary optical communication pathway, the secondary optical communication pathway, and an electrical communication pathway that is substantially co-routed with the primary and secondary optical communication pathways.

Another aspect of the disclosure is the method described above, wherein the communication error signal is communicated using out-of-band optical signaling.

Another aspect of the disclosure is the method described above, wherein the primary optical communication pathway includes one or more primary optical fibers and wherein the secondary optical communication pathway includes one or more secondary optical fibers.

Another aspect of the disclosure is the method described above, wherein the act of the at least one of the first and second E-O interface devices automatically reconfiguring itself includes: a controller receiving the communication error signal and in response causing an electrical switch electrically connected thereto to divert an electrical signal that originally travels to a primary light source to instead travel to a secondary light source.

Another aspect of the disclosure is the method described above and further including: performing an initial communication of the optical signals as test signals and comparing the communication of the test signals to at least one reference value to determine whether or not the communication error occurs; and if the communication error has not yet occurred, performing a communication between the first and second E-O interfaces devices to allow the transmission of the optical signals as data signals over the primary optical communication pathway according to act b) until the communication error occurs, and including deriving the optical data signals from electrical data signals from one of the first and second external devices.

Another aspect of the disclosure is the method described above, wherein the act of performing the communication to allow the transmission of the optical signals as data signals is carried out over at least one of: i) the primary optical communication pathway, ii) the secondary optical communication pathway and ii) an electrical communication pathway that is that is substantially co-routed with the primary and secondary optical communication pathways.

Another aspect of the disclosure is a method of performing data communication between first and second external devices respectively connected to first and second E-O interface devices, comprising: a) activating a primary light source on the first E-O interface device to transmit first optical signals over a primary transmit optical fiber that optically connects the primary light source to a primary photodetector at the second E-O interface device; b) activating at least one secondary light source on the first E-O interface device to transmit second optical signals over a secondary transmit optical fiber that optically connects the primary light source to a secondary photodetector at the second E-O interface device, wherein the first and second optical signals are substantially identical and carry substantially identical information; c) converting the first optical signals into corresponding first electrical signals at the second E-O interface device, and providing first electrical signals to the second external device; d) monitoring the sending of the first optical signals for a communication error; and e) when the communication error occurs, the second E-O interface device automatically reconfiguring itself to convert the second optical signals into corresponding second electrical signals that are substantially identical to the first electrical signals and providing the second electrical signals to the second external device.

Another aspect of the disclosure is the method described above, wherein the first and second optical signals are data signals.

Another aspect of the disclosure is the method described above, wherein the first and second optical signals are test signals designed to establish optical communication over either the primary transmit optical fiber or over both the primary and secondary transmit optical fibers prior to transmitting the first and second optical signals as data signals.

Another aspect of the disclosure is an E-O interface device for transmitting data between a first external device and second external device over transmit optical fibers. The device includes: a primary light source optically coupled to a primary one of the transmit optical fibers and configured to generate, from an electrical signal from the first external device, primary optical signals for transmission over the primary transmit optical fiber; a secondary light source optically coupled a secondary one of the transmit optical fibers and configured to generate from the electrical signal secondary optical signals for transmission over the secondary transmit optical fiber; an electrical switch electrically connected to the primary and secondary light sources; a controller electrically connected to the electrical switch; and wherein the controller is configured to set the electrical switch to activate the secondary light source to transmit the secondary optical signals based upon information about a transmission error of the primary optical signals.

Another aspect of the disclosure is the E-O interface device described above, wherein the primary and secondary light sources are respectively electrically connected to primary and secondary light-source drivers, and wherein the electrical switch can direct an electrical signal to either the primary light-source driver or the secondary light source driver.

Another aspect of the disclosure is the E-O interface device described above, wherein the primary and secondary optical signals are either data signals or test signals.

Another aspect of the disclosure is the E-O interface device described above, wherein the electrical signal is an input electrical data signal and wherein primary and secondary optical signals are data signals generated from the input electrical data signal.

Another aspect of the disclosure is the E-O interface device described above, further including a primary photodetector and a secondary photodetector, and wherein the E-O interface device can operate as both a transmitter of the primary and secondary optical signals and a receiver of other primary and secondary optical signals sent by another E-O interface device.

Another aspect of the disclosure is a data communication system that includes: a first E-O interface device as described above and electrically connected to the first external device; a second E-O interface device electrically connected to the second external device and optically coupled to the first E-O interface device by the primary and secondary transmit optical fibers, the second E-O interface device configured with primary and secondary photodetectors respectively arranged to receive and convert the primary and secondary optical signals into primary and secondary electrical signals for processing by the second external device.

Another aspect of the disclosure is the data communication system described above, wherein the primary and secondary transmit optical fibers are substantially co-routed.

Another aspect of the disclosure is the data communication system described above and further including an electrical link that electrically connects the first and second E-O interface devices, wherein the electrical link is substantially co-routed with at least one of the primary and secondary transmit optical fibers.

Another aspect of the disclosure is an E-O interface device for receiving primary optical signals and secondary optical signals over respective primary and secondary receive optical fibers. The device includes: a primary photodetector optically coupled to the primary receive optical fiber and configured to receive the primary optical signals and generate therefrom primary electrical signals; a secondary photodetector optically coupled a secondary one of the receive optical fibers and configured to receive secondary optical signals and generate therefrom secondary electrical signals, respectively; a multiplexer unit electrically connected to primary and secondary photodetectors and that is configured to receive the primary and secondary optical signals; a controller electrically connected to the multiplexer unit; and wherein the primary and secondary optical signals are substantially identical and wherein the secondary optical signals are received when the primary optical signals are no longer received due to a receive error relating to the primary optical signals, and wherein the controller is configured to set the multiplexer unit to initially receive and direct the primary signals to the first external device and then set the multiplexer unit to receive and direct the secondary signals to the first external device when the receive error occurs.

Another aspect of the disclosure is the E-O interface device described above, wherein the controller is electrically connected to another E-O interface device that also includes a controller, and wherein information about the receive error is communicated between the E-O interface device controllers via at least one of: a transmit optical fiber, the primary receive optical fiber, the secondary receive optical fiber, and an electrical link.

Another aspect of the disclosure is a data communication system that includes: a first E-O interface device according to claim 21 and electrically connected to the first external device; and a second E-O interface device electrically connected to the second external device and optically coupled to the first E-O interface device by the primary and secondary receive optical fibers, the second E-O interface device configured to receive from the first external device first electrical signals and generate therefrom the primary and secondary optical signals.

Another aspect of the disclosure is the data communication system described above, wherein the primary and secondary receive optical fibers are contained in an optical fiber cable.

Another aspect of the disclosure is the data communication system described above, further including an electrical pathway between the first and second E-O interface devices, wherein the electrical pathway is substantially co-routed with the primary and secondary receive optical fibers.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. In addition, terms such as "vertical" and "horizontal" are used for the sake of reference and ease of discussion and are not intended to be limiting as to direction or orientation.

The term "error" as used in connection with a data communication pathway means that the communication pathway fails to meet one or more communication (i.e., transmission and/or reception) criteria. Thus, a communication pathway error can mean a complete or partial loss of transmission and/or a complete or partial loss of reception. In an example, the error can mean that the data rate of transmission or reception falls below a threshold data rate value.

Reference to a communication error as being associated with a transmit or receive function is in the context of designating one E-O interface device as a "transmit" device and another as a "receive" device for ease of explanation. As noted below, a given E-O interface device may be configured to serve as both a transmitter and a receiver. In such a case, one skilled in the art will understand that a "transmit error" or "transmitter error" or a "transmission error," etc., is the same as a "receiver error" or "receiver error" or "reception error," etc., and are each generally considered to be a (data) communication error.

The term "optical communication pathway" as used in the context of sending optical signals (e.g., primary optical signals or secondary optical signals) is not limited to a single route or channel or a single optical fiber, and can include multiple routes or channels, such as formed for example by multiple optical fibers.

In the discussion below, reference is made to primary optical signals and secondary optical signals. Unless otherwise indicated, the primary optical signals are substantially identical to the secondary optical signals, meaning that they carry substantially the same information within the usual tolerances in the art as defined by bit-error rates, sources of electronic noise, etc. In an example, the primary and secondary optical signals are substantially identical because they are derived or generated from a common electrical signal (e.g., an input electrical data signal) from an electronic device to which the electrical-optical interface device is attached.

Example E-O Interface Devices

Figure 1A:
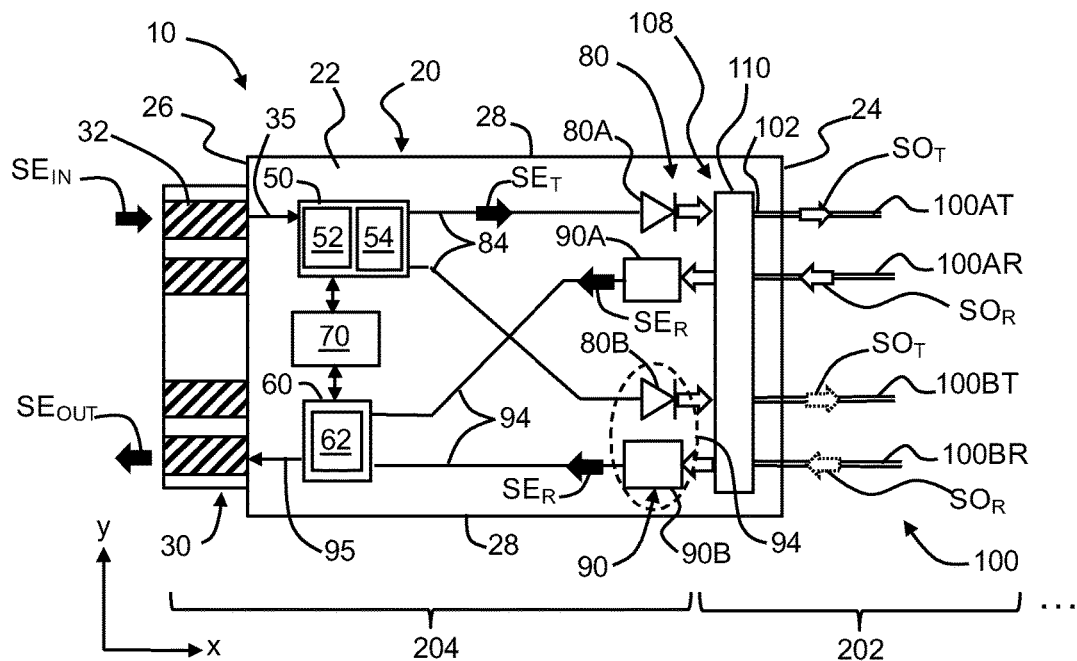
FIGS. 1A and 1B are schematic diagrams of example E-O interconnection devices as disclosed herein.
Figure 1B:
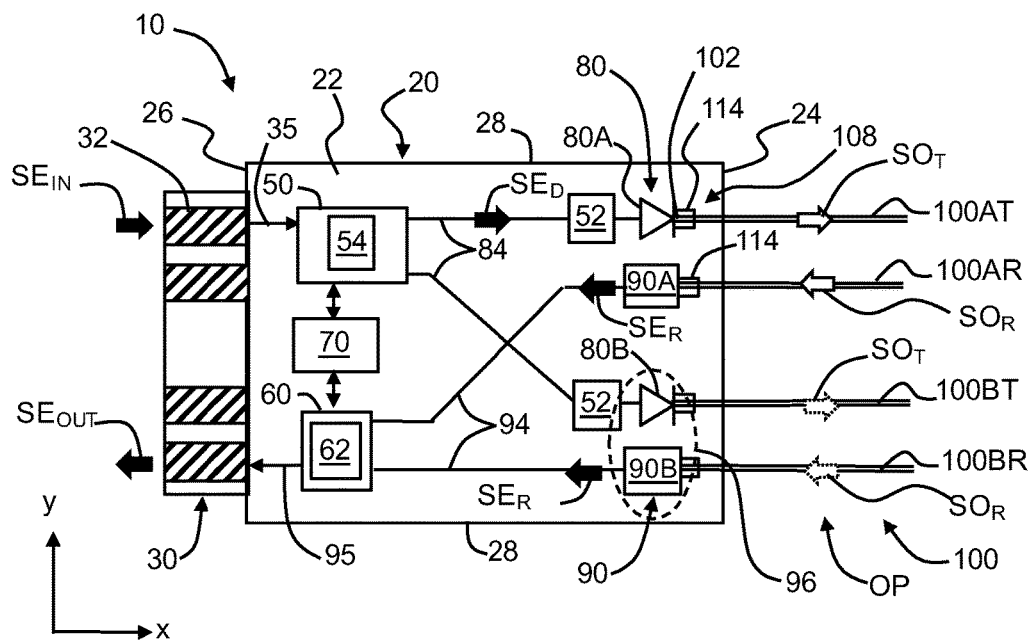

FIGS. 1A and 1B are schematic diagrams of example electrical-optical (E-O) interface devices 10 as disclosed herein. The E-O interface device includes a substrate 20 having a surface 22 that operably supports electrical and optical components and interconnections as described below. In an example, substrate 20 is or includes a printed circuit board (PCB). Substrate 20 includes a front end 24, a back end 26 and opposite sides 28. The E-O interface device 10 includes an electrical connector 30 operably disposed at back end 26 of substrate 20. The electrical connector 30 includes two or more electrical contacts 32.

The E-O interface device 10 includes a switch unit 50. In the example configuration of FIG. 1A, the switch unit includes a source driver 52 electrically connected to an electrical switch ("switch") 54. In the example configuration of FIG. 1B, switch unit 50 includes only switch 54 and the multiple source drivers 52 are located downstream of switch unit. The switch unit 50 is electrically connected to electrical connector 30 via an electrical line 35.

The E-O interface device 10 also includes a multiplexer unit 60 that is also electrically connected to electrical connector 30 via individual output electrical lines 95. The multiplexer unit 60 includes a multiplexer 62 configured to receive and then multiplex multiple input electrical signal pathways or channels 94 onto the individual electrical lines 95 that lead to electrical connector 30. The multiplexer unit 60 can include additional circuit elements such as amplifiers, filters, analog-to-digital (A/D) converters, etc.

Both the switch unit 50 and the multiplexer unit 60 are electrically connected to a controller 70, e.g., a microprocessor. In an example, controller 70 is configured with instructions embodied in a non-transient computer-readable medium, wherein the instructions cause the controller to communicate with and configure switch 54 as described below. The instructions may be in the form of software, firmware, logic or logicware. In an example, the switch unit 50, multiplexer unit 60 and controller 70 may all be part of a single integrated circuit (IC) chip. One skilled in the art will appreciate that there are a host of ways to configure the electrical and optical components of E-O interface device 10 to achieve the functionality described herein.

With continuing reference to FIGS. 1A and 1B, E-O interface device 10 includes two or more light sources 80, with the example devices of FIGS. 1A and 1B showing two such light sources individually denoted as 80A and 80B by way of illustration. The two light sources 80A and 80B reside adjacent front end 24 of substrate 20 and are electrically connected via electrical lines 84 to switch unit 50. In the example embodiment of FIG. 1B, each light source 80 is electrically connected to a corresponding source driver 52, which in turn are electrically connected to switch unit 50.

The E-O interface device 10 also includes two or more light detectors ("photodetectors") 90, with the example devices of FIGS. 1A and 1B showing two such photodetectors individually denoted as 90A and 90B. The two photodetectors 90A and 90B also reside adjacent front end 24 of substrate 20 and are electrically connected via electrical lines 94 to multiplexer unit 60. In an example, electrical lines 84 and 94 are formed by metal wire films that are commonly used in PCBs to form electrical connections between components. The electrical lines 84 and 94 also constitute electrical pathways, e.g., electrical lines 84 constitute part of a transmit electrical pathway and electrical lines 94 constitute part of a receive electrical pathway.

In an example, light sources 80A, 80B and photodetectors 90A and 90B are arranged in alternating or interleaved fashion, i.e., 80A-90A-80B-90B in the −y direction from the uppermost to the lowermost side 28 of substrate 20. In an example, each pair of adjacent light sources 80 and photodetectors 90 can be considered as defining a transducer pair 96, while the light sources and photodetectors can be considered as being collectively forming a transducer array 98 (see FIG. 3). In another example shown in FIG. 5B discussed below, the light sources 80 and photodetectors 90 can be formed as separate groups.

An example light source 80 is a laser, such as a vertical-cavity surface-emitting laser (VCSEL). An example photodetector 90 used for photodetectors 90A and 90B is a photodiode. Both light sources 80 and photodetectors 90 can be configured either as single elements or as arrays. Other types of light sources 80 and photodetectors 90 can be used, and VCSELs and photodiodes are considered herein by way of example.

The E-O interface devices 10 of FIGS. 1A and 1B are shown optically connected to ends 102 of optical fibers 100. Four optical fibers 100 are shown by way of example, with the individual optical fibers denoted 100AT, 100AR, 100BT, 100BR, where the "T" stands for "transmit" and the "R" stands for "receive." In an example, optical fibers 100 are optically connected to the E-O interface device 10 using at least one coupling system 108, such as a direct coupling system 110 (FIG. 1A), or an optical coupling system 114 (FIG. 1B), or a combination of such coupling systems.

The optical coupling system 110 of FIG. 1A is configured by way of example to accommodate all four optical fibers 100AT, 100AR, 100BT, 100BR. The direct coupling system 114 of FIG. 1B is configured to directly couple the respective ends 102 of optical fibers 100 to corresponding light sources 80 and photodetectors 90, i.e., there are no intervening optical elements. In the case of direct optical coupling, the ends 102 of optical fibers 100 are positioned on or near the active areas of the light sources 80 and photodetectors 90. Here, the direct coupling system 114 can include at least one mechanical joint, at least one mechanical fixture and/or at least one mechanical securing device. Multiple direct coupling systems 114 are shown in FIG. 1B by way of example, one for each optical fiber 100. A single direct coupling system 114 can also be employed, as can multiple direct coupling systems that each accommodates a single optical fiber or a subset of the optical fibers.

Figure 2:
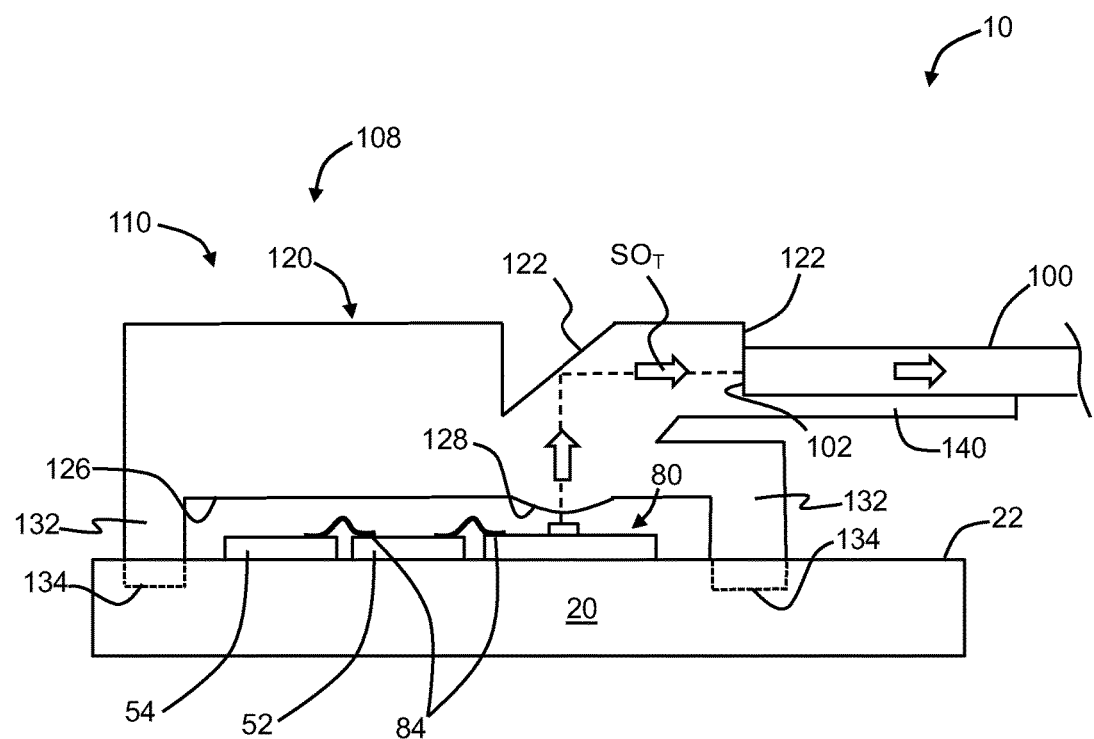
FIG. 2 is a side view of an example E-O interface device that includes an optical coupling system configured as a monolithic structure made of a transparent material and that includes an angled total-internal-reflection surface and a lensed surface.

FIG. 2 is a side view of an example E-O interface device 10 that utilizes a coupling system 108 in the form of an optical coupling system 110 configured as a monolithic structure 120 made of a transparent material (e.g., ULTEM). The monolithic structure 120 includes a planar front vertical surface 122, an angled total-internal-reflection surface 124 and a bottom horizontal surface 126 that includes a convex lens 128. The monolithic structure 120 includes stand-off features 130 that engage corresponding receiving features 134 supported by or formed in substrate surface 22 so that convex lenses 128 are spaced apart from light sources 80 (as shown in FIG. 2A) and photodetectors 90 in a similar fashion (not shown in FIG. 2A).

In an example, monolithic structure 120 includes a support shelf 140 with support features (not shown) such as grooves (e.g., v-grooves or u-grooves) configured to support end portions of optical fibers 100 so that the optical fiber ends 102 reside adjacent (e.g., in close contact with) planar front surface 122. The structure 120 also serves a protective function for the other components of the E-O interface device 10 that are mounted on or otherwise supported by substrate 20.

In other examples, multiple coupling systems 108 can be employed to optically couple fibers 100 to respective light sources 80 and photodetectors 90. For example, multiple optical coupling systems 110 can be employed, multiple direct coupling systems 114 can be employed, or a combination of the two different coupling systems can be employed. In particular, for improved link availability, two redundant sets of coupling systems 108 can be employed; one for the primary optical fibers that define the primary data communication system and one for the secondary optical fibers that define the redundant optical communication optical systems. This configuration can protect a data communication system against a failure of the coupling system used for the primary optical fibers.

The E-O interface device 10 may typically include a number of other signal-processing components known in the art, such as transimpedance amplifiers, filters, signal-pre-emphasis elements, signal de-emphasis elements, limiting amplifiers, timers, re-timers, etc. (not shown).

Figure 3:
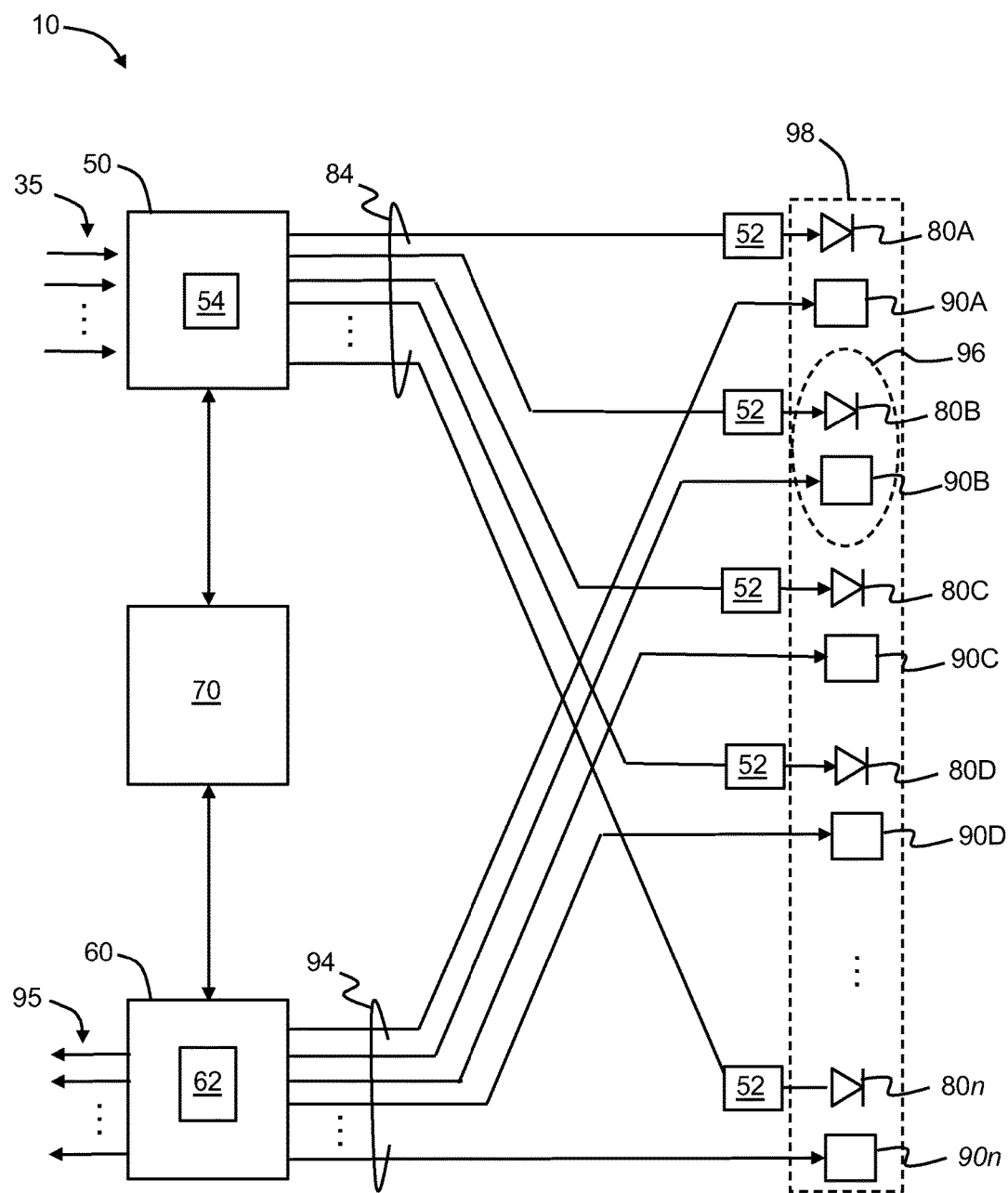
FIG. 3 is a schematic diagram of a generalized configuration of an E-O device as disclosed herein, wherein the light sources and the photodetectors are arranged in transducer pairs that make up a transducer array.

As noted above, E-O interface device 10 can include two or more light sources 80 and/or two or more photodetectors 90. FIG. 3 is a schematic diagram similar to FIG. 1B that illustrates a generalized configuration of E-O interface device 10 having n light sources 80 (80A, 80B, 80C, 80D, . . . 80n) electrically connected to n source drivers 52 and to switch unit 50 via n electrical lines 84. The example E-O interface device 10 also has n photodetectors 90 (90A, 90B, 90C, 90D . . . 90n) electrically connected to multiplexer unit 60 via n electrical lines 94.

The electrical connector 30 of E-O interface device 10 may be selected so that it is compatible with select external apparatus or devices (see FIGS. 4A, 4B), while also supporting a desired data rate for the application (e.g. video data rates). In an example, controller 70 is configured to provide link management and reporting functions. In addition, controller 70, which may be integrated with other electronic components or may be a discrete component, can be used to configure or otherwise set switch 54 to perform the switching function described below, based on either internal logic or external commands.

With reference again to FIGS. 1A and 1B, light sources 80A and 80B are respectively optically connected to transmit optical fibers 100AT and 100BT while photodetectors 90A and 90B are respectively optically connected to receive optical fiber 100AR and 100BR. The transmit and receive optical fibers 100AT and 100AR respectively constitute primary transmit and secondary receive pathways, while the transmit and receive optical fibers 100BT and 100BR respectively constitute a secondary or redundant optical pathways.

Data Communication System

Figure 4A:
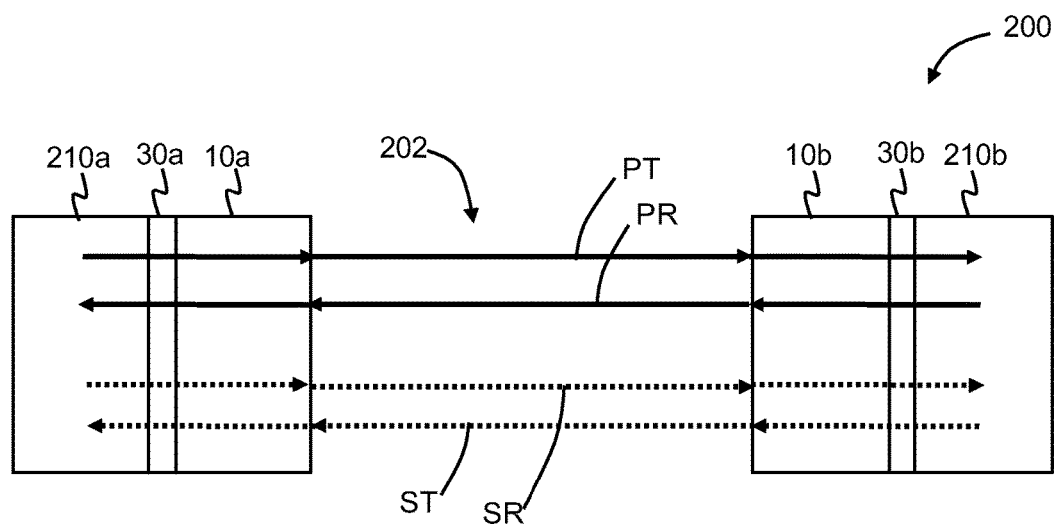
FIGS. 4A and 4B are schematic diagrams of an example data communication system that includes two of the E-O interface devices as disclosed herein and optically connected by optical fibers that define a primary transmit pathway, a primary, a secondary transmit pathway and a secondary receive pathway.
Figure 4B:
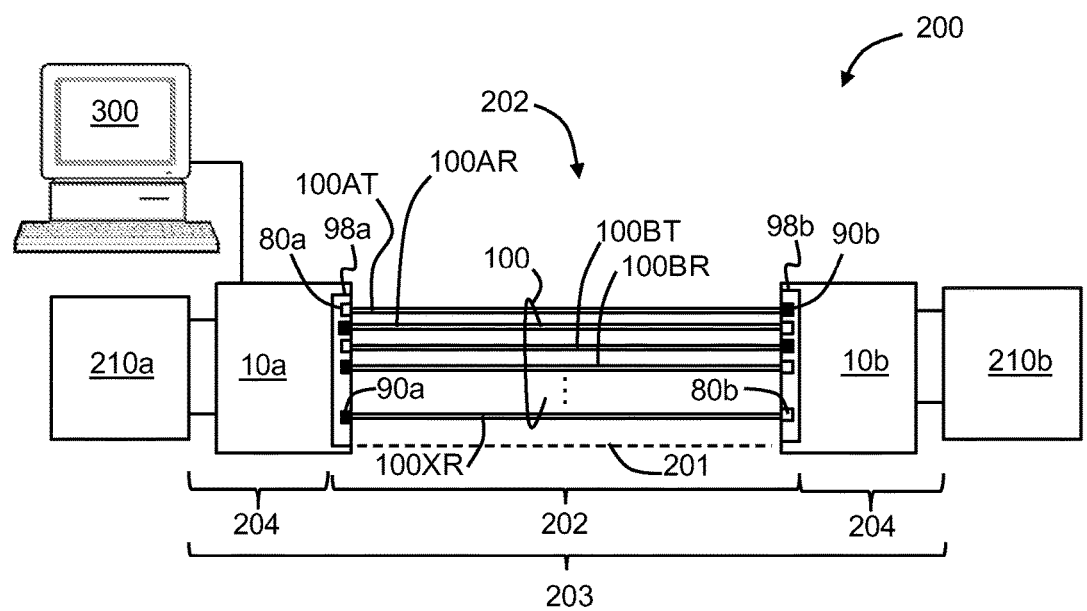

FIGS. 4A and 4B are schematic diagrams of an example data communication system 200 that includes two E-O interface devices 10 individually denoted 10a and 10b and optically connected by an optical link 202 (FIG. 4A) that includes optical fibers 100 (FIG. 4B). For ease of discussion in this example, E-O interface device 10a is referred to as the "transmit E-O interface device" or the "transmit side" and the E-O interface device 10b is referred to as the "receive E-O interface device" or "receiver side." It will be understood by one skilled in the art that E-O interface devices 10a and 10b may each simultaneously function as a transmitter and a receiver. It is also noted that the E-O interface devices 10a and 10b on opposite sides of data communication system 200 need not be identical, e.g., one E-O interface device can have just light sources 80 and the other just photodetectors 90. There are benefits to having the E-O interface devices 10a and 10b be the same, as there are many data protocols that are symmetric and such a configuration can use the same control logic (logicware, software, firmware, etc.) on each side.

The two E-O interface devices 10a and 10b and optical fibers 100 that operably connect the two constitute a harness 203. In an example, the optical fibers 100 are substantially co-routed, e.g., are carried within at least a section of an optical fiber cable 100C (see FIG. 8).

FIG. 4A schematically illustrates an example of optical link 202 that includes four distinct communication pathways between the transmit and receive E-O interface devices 10a and 10b: A primary transmit pathway PT, a primary receive pathway PR, a secondary transmit pathway ST and a secondary receive pathway SR. Each of the transmit communications pathways PT and ST employs at least one transmit optical fiber 100T and each of the receive pathways PR and SR employs at least one receive optical fiber 100R, as illustrated in FIG. 4B. Switching from the primary pathways to the secondary pathways using the E-O interface devices 10 described herein is described in below. In an example, primary transmit pathway PT, a primary receive pathway PR, a secondary transmit pathway ST and a secondary receive pathway SR may be substantially co-routed. In another example, primary transmit pathway PT and secondary transmit pathway ST may be substantially co-routed while the primary receive pathway PR and the secondary receive pathway SR may be substantially co-routed.

In an example, optical link 202 includes optical fibers 100 and the two transducer arrays 98*a* and 98*b*, wherein the transmit pathways PT and ST and the receive pathways PR and SR are respectively defined by the individual transmit and receive optical fibers 100AT and 100AR. In FIG. 4B, by way of example, a single pair of optical fibers 100 (specifically, transmit and receive fibers 100AT and 100AR) define the primary transmit and receive pathways PT and PR, while the other transmit and receive optical fibers (100BT, 100BR, . . . 100XR) define the secondary transmit and receive pathways ST and SR.

The transmit and receive optical fibers 100T and 100R constitute respective optical portions of transmit and receive communication channels of the data communication system 200 that extend between external devices 210*a* and 210*b*. The portion of the data communication system 200 that resides within the E-O interface devices 10*a* and 10*b* and that is not part of the optical link 202 (e.g., input and output electrical lines 35 and 95, and electrical lines 84 and 94) constitutes an internal electrical link or an internal electrical pathway 204 (see also FIG. 1A). In particular, input electrical line 35 and electrical lines 84 constitute an internal transmit electrical pathway while output electrical line 95 and electrical lines 94 constitute an internal receive electrical pathway. Thus, the transmit and receive pathways can each include an internal electrical portion and an optical portion. The data communication system 200 has operational redundancy due to the reconfigurable transmit and receive pathways in the two E-O interface devices 10*a* and 10*b*.

General Operation of E-O Interface Device

In an example, E-O device 10 is configured as part of data communication system 200 such as shown in FIGS. 4A and 4B. As such, in an example E-O device 10 is configured (e.g., programmed) to perform a test communication (e.g., with the E-O device in the system) to establish the transmit and receive pathways, including identifying primary and secondary transmit and receive pathways.

In an example, E-O interface device 10 can perform three primary functions as part of data communication system 200, namely to: a) receive input electrical signals and convert them to optical signals, which are then transmitted over the one or more transmit optical fibers 100T associated with a primary transmit pathway; b) receive optical signals from the receive optical fibers 100R associated with the primary communication pathway and convert the received optical signals to output electrical signals; and c) switch the communication pathway from the primary communication pathway to the secondary (redundant) communication pathway when the data communication over the primary communication pathway fails to meet one or more transmission criteria (e.g., due to a data communication error).

More specifically, with respect to function c): if there is an error on a receive channel, then the at least one primary receive pathway PR is changed to at least one secondary receive pathway SR. If there is an error that adversely affects the primary transmit pathway PT, then far-end receiver 10*b* may notify the transmitter 10*a*, and the primary transmit pathway PT is changed to the secondary transmit pathway ST. Transmission errors can be monitored and detected during the initial start-up of data communication system 200 by using test signals or can be monitored and detected during operation by monitoring the data communication using the data signals.

In an example, when a communication error occurs, the receive E-O interface device 10*b* will use its switch 54 to change the primary receive optical path to the secondary receive pathway. If there is at least one secondary path for each primary path, then this switching can be done solely at the receive E-O interface device 10*b* so that only the receive E-O interface device changes its operational state. Since in an example the detection of a communication error is done at the receive E-O interface device 10*b*, this means that no error communication or signaling (e.g., via a communication error signal) needs to be sent to the transmit E-O interface device 10*a*. In other cases, the transmit E-O interface device 10*a* is notified of the error state via a message (e.g., error communication signal) from the receive E-O interface device 10*b* so that it can transmit over one of the secondary transmit pathways. In this case, both the transmit and the receive E-O interface devices 10*a* and 10*b* change their operational states.

To simplify the encoding and separation of data from optical link status or information regarding the possible failure of the primary transmit pathway PT, out-of-band signaling can be used. In one embodiment, electrical signaling over an electrical link 201 connecting the two E-O interfaces is used (see FIG. 4B). In an example, the electrical link 201 defines an electrical communication pathway ("electrical pathway") or electrical connection that is substantially co-routed with at least one of the transmit and receive pathways. The electrical link 201 can be in the form of an electrical conductor such as an electrical transmission line or electrical wire. In another embodiment, the link status information (e.g., communicator error status) is transmitted through amplitude or phase modulation of the optical carrier.

In the transmit operation of E-O interface device 10 according to FIG. 1B, an input electrical data signal $SE_{IN}$ is transmitted through electrical connector 30 to switch unit 50 via input electrical line 35. The switch unit 50 receives the electrical data signal $SE_{IN}$ and directs this signal to one of the source drivers 54, depending on how controller 70 has set switch unit 50. When the electrical drive signal $SE_T$ drives light source 80A, it causes this light source to generate a transmit optical signal $SO_T$, which is coupled into and travels in transmit optical fiber 100AT.

Likewise, when the electrical drive signal $SE_T$ drives light source 80B, it causes this light source to also generate another transmit optical signal $SO_T$, which is coupled into and travels in transmit optical fiber 100BT. In the initial configuration of E-O interface device 10, switch 54 is configured to direct the electrical input signal $S_{IN}$ to the source driver 52 associated with light source 80A so that the transmit optical signals $SO_T$ travel over transmit optical fiber 100AT, which constitutes the primary transmit pathway.

In the receive operation of E-O interface device 10, receive optical fiber 100AR carries a receive optical signal $SO_R$, which is received by photodetector 90A. The photodetector 90A converts receive optical signal $SO_R$ into a receive electrical signal $SE_R$. The receive electrical signal $SE_R$ travels over the corresponding electrical line 94 to multiplexer unit 60, which directs this electrical signal onto a single one of the electrical lines 95 and then to electrical connector 30 as an output electrical data signal $SE_{OUT}$.

Likewise, receive optical fiber 100BR can carry receive optical signal $SO_R$, which is received by photodetector 90B, which converts this optical signal into receive electrical signal $SE_R$. The receive electrical signal $SE_R$ travels over the corresponding electrical line 94 to multiplexer unit 60, which directs this electrical signal to a single one of electrical lines 95 and then to electrical connector 30 as and output electrical data signal $SE_{OUT}$. In the initial configuration of E-O interface device 10, the receive optical signals $SO_R$ are received using receive optical fiber 100AR, which constitutes at least a portion of primary receive pathway PR (see FIGS. 4A, 4B).

The transmit optical signals $SO_T$ carried away from E-O interface device 10 by transmit optical fiber 100AT can be sent to one or more other E-O interface devices, or can be routed together to provide additional data transmission capacity (i.e. multiple lanes) between one data source and one destination. In the examples of FIGS. 1A and 1B, transmit optical fiber 100AT constitutes at least a part of primary transmit pathway (link) PT, and transmit optical fiber 100BT constitutes part of the secondary transmit pathway (link) ST that provides redundancy and allows for continued data transmission using E-O interface 10 device in the event of transmit error. Likewise, receive optical fiber 100RA defines at least a portion of the primary receive pathway PR and receive optical fiber 100BT defines at least a portion of the secondary or redundant receive pathway SR that provides redundancy and allows for continued data reception using E-O interface 10 device in the event of a receive error.

Generally, E-O interface device 10 can be configured to have a total of N primary transmit optical fibers (e.g., 100AT) and M primary receive fibers (e.g., 100AR), and P secondary transmit optical fibers (100BT, 100CT, etc.) and Q additional secondary receive optical fibers (100BR, 100CR, . . . ).

While many data protocols call for M=N and P=Q, certain data protocols (e.g., some video transmission protocols) can have asymmetric data transmission capability so that in general N does not have to equal M and P and Q do not have to equal M or N or each other. The larger the P and Q are, the more cumulative errors that E-O interface device 10 can sustain and remain in working order, but the higher the cost of the device. The reliability/performance trade-off is application-specific, but even the case of P=1 (and 0=1 if M>0) provides a substantial improvement in reliability.

For the case where there are multiple secondary pathways for each primary pathway, the transmit E-O interface device 10a can be configured to simultaneously transmit over all available pathways for each transmit signal and have the receive E-O interface device 10b decide which pathway to designate as the primary receive pathway.

In the event that communication over the primary communication pathway (i.e., the at least one primary transmit pathway and the at least one primary receive pathway) fails to meet one or more communication criteria (e.g., data errors or insufficient optical power) during monitoring of the transmit and receive process, controller 70 reconfigures switch 54 so that the generation of transmit optical signals $SO_T$ occurs at one of the redundant light sources 80 and the transmission of the transmit optical signals takes place over one the redundant (secondary) optical fibers 100T. How the communication over the data communication system is monitored and how this information is used to reconfigure the E-O interface device 10 as part of the communication optical system is discussed below.

It may be desirable to mask or otherwise make transparent the redundancy of data communication system 200 from the external devices 210a and 210b. Thus, in an example the data communication system 200 is configured to automatically monitor communication performance for transmit and receive errors and the reconfigure the data communication system to overcome any errors. Error modes of the communication optical system 200 that one may want to protect against are associated with optical link 202 and include degradations or failures of one or more of a light source 80, one or more photodetector 90 and one or more optical fibers 100. Such degradations and failures tend to result in a significant or complete loss of power and so can be readily detected.

As noted above, in an example the performance of the transmit and receive pathways of optical communication system 200 are checked during configuration or during operation, or can be done during both phases. Thus, in one example embodiment, data communication system 200 evaluates the performance of the available transmit and receive pathways before transmitting data, and configures the receive E-O interface device 10b and optionally the transmit E-O interface device 10a to allocate optical fibers 100T and 100R to the primary and secondary transmit pathways PT and ST and the primary and secondary receive pathways PR and SR.

In a second example embodiment, data communication system 200 allocates the available primary and secondary transmit pathways PT and ST and the primary and secondary receive pathways PR and SR based on default settings or prior performance data and then monitors the communication performance to detect when a communication error occurs. One performance monitoring method includes monitoring the optical power communicated over optical link 202, and in particular over the primary transmit and receive pathways PT and PR. This can be accomplished in one example by measuring an average received optical power (e.g., with an integration period typically at least several data bits long) to see if the average received optical power for the given pathway is or has dropped below a prescribed operating threshold.

Another approach to monitoring the performance of data communication system 200 involves the use of error detection. For example, an odd number of transmit optical fibers 100T can be employed for data transmission. The controller 70 at the receive E-O interface device 10b analyzes the data and accepts the data transmitted by the majority of the transmit pathways defined by the transmit optical fibers 100T. Alternatively, the receive E-O interface device 10b can monitor the bit-error rate of the transmitted data signals carried by the primary transmit pathways PT. The bit-error rate of the transmission can be monitored in one example by using a cyclic redundancy check (CRC) embedded in the data signal to look for errors. In another example, controller 70 is configured to receive and process (e.g., analyze) the data signals carried over the primary transmit and primary receive pathways PT and PR and of data communication system 200 to perform error detection. An advantage of error-detection monitoring is that is provides for the ability to detect error modes that power-detection monitoring alone could miss. In an example, a combination of power-detection monitoring and error-detection monitoring is employed.

Once a communication error is detected in the one or more of the primary transmit and/or receive pathways PT and PR, the result is used by at least one of transmit and receive E-O interface devices 10a and 10b to utilize at least one transmit and/or at least on receive pathway. In an example, the transmission and/or reception can continue along the original transmit and/or receive pathways as well, even though or both of these pathways may not be fully functional. This may be done for convenience or to reduce system complexity.

In cases where the transmit state needs to be changed, the error state is communicated to the transmit E-O interface device 10a to change the transmission of data from the primary transmit pathway PT to the secondary transmit pathway ST. The logic to determine and then set the new transmit state may be provided by either the transmit-side or receive-side controller 70.

There are several other options for conveying communication performance information of data communication system 200, depending on the availability of resources in the data communication system. For example, the separate electrical link 201 (dashed line in FIG. 4A) that electrically connects the transmit and receive E-O interface devices 10a and 10b can be used to transmit the performance information between the two E-O interface devices. Such information only requires minimal bandwidth and thus a rather simple electrical link 201. Furthermore, the electrical link 201 has a different set of vulnerabilities than the optical link 202 so that in error in one is not likely to occur with the error of the other.

Alternatively, some or all of the available optical fibers 100 can be used to transmit the performance information either direction over the communication optical system 200, including the identity of a failed component. In an example, out-of-band, low-bandwidth signaling, such as a low amplitude or phase/frequency modulation or even a different wavelength, that falls outside of the band of the data signal, can be used to carry the performance information by multiplexing the low-bandwidth performance signal with the high-bandwidth data signals Following the communication of the error state to the transmit E-O interface device 10a (e.g., via a communication error signal), the receive side E-O interface device 10b and optionally the transmit E-O interface device 10a is/are configured to map the affected stream of data signals onto one or more of the available secondary transmit and/or pathways ST and SR. In one example, this is accomplished by sending a communication error signal to the controller 70 of the E-O interface device 10a or 10b from which the data signals originated, and then having the controller 70 reconfigure the E-O interface device accordingly by setting switch 54. This can be done in a number of ways, with the best approach depending on the timing requirements of the protocol being transmitted over the optical link 202 and its reliability requirements.

In one example, the transmit E-O interface device 10a maintains a default startup link allocation that is updated and stored locally in persistent memory (e.g. an EEPROM, which can be part of controller 70) if the controller is notified of a communication error.

In another example, all light sources 80 of each of the E-O interface devices 10a and 10b transmit test signals to the photodetectors 80 of the other E-O interface device in an attempt to establish working communication pathways between the two E-O interface devices before actual data signals are transmitted. This can be done by transmitting test signals, which can be in the form of a pre-set sequence of bits, between the E-O interface devices 10a and 10b and confirming receipt. If a valid test signal is not detected, the two E-O interface devices 10a and 10b communicate over one of the operable communication links to establish the identity of the failed communication pathway.

In an example, the controllers 70 then use the error information (including any diagnostic information) to configure the switch 54 at the transmit E-O interface device 10a to direct the optical data signals $SO_T$ to one or more secondary transmit optical fibers 100T. If there are not enough back-up (secondary) transmit optical fibers 100T to transmit the data signals over the optical link 202, the controller 70 in one or both E-O interface devices 10 link can notify the corresponding external devices 210a and/or 210b of the error state. In addition, the controller 70 may be programmed to have a priority for the input data streams to increase the chance that some data is transmitted even in the event of multiple component/link errors.

In another example of the operation of data communication system 200, the communication optical system starts up normally and starts transmitting data signals from external device 210a to external device 210b. The functional data signals transmitted over the optical transmission path can be encoded derivatives of the electrical signals provided to the E-O interfaces from the external devices. The data communication system 200 then checks for communication errors on a continuing or periodic basis, changing the transmit and/or receive communication pathways as needed when an error occurs. At this point, the secondary communication pathway employed becomes the new primary communication pathway, and any other unused secondary communication pathways remain available for further redundancy. The communication optical system 200 then operates with the new primary communication pathways as before while continuing to monitor communication performance.

It may be that data communication system 200 will have to request a re-start from one of the external devices 210a or 210b when the data transmission is interrupted by an error. The resetting of data communication system 200 can be done by either a direct command, by signaling an error state, or by an automatic reset based on a communication between the external device 210 and controller 70 of the adjacent E-O interface device.

For increased robustness to multiple communication errors, the secondary transmit and receive pathways ST and SR can be tested and the information used to report any potential communication issues during the power-up sequence. Finally, upstream information can be direction or wavelength multiplexed onto the primary transmit and receive pathways PT and PR or the secondary transmit and receive pathways ST and SR to provide upstream communication, e.g., if the nominal or payload data requirements of optical link 202 do not require a fiber link in this direction (e.g. M=0 or N=0).

Vehicle communication protocols do not currently have the capability to manage secondary or redundant transmit and receive pathways ST and SR. However, this capability can be added to higher levels of the communication protocol, thereby allowing communication pathway allocations to be managed externally. FIG. 4B includes an example of an external interface 300. In this case, switch 70 used to define the communication pathways between E-O interconnect devices 10a and 10b in communication optical system 200 can be configured based on commands received over external electronic interface 300 rather than internally as described above.

Figure 5A:
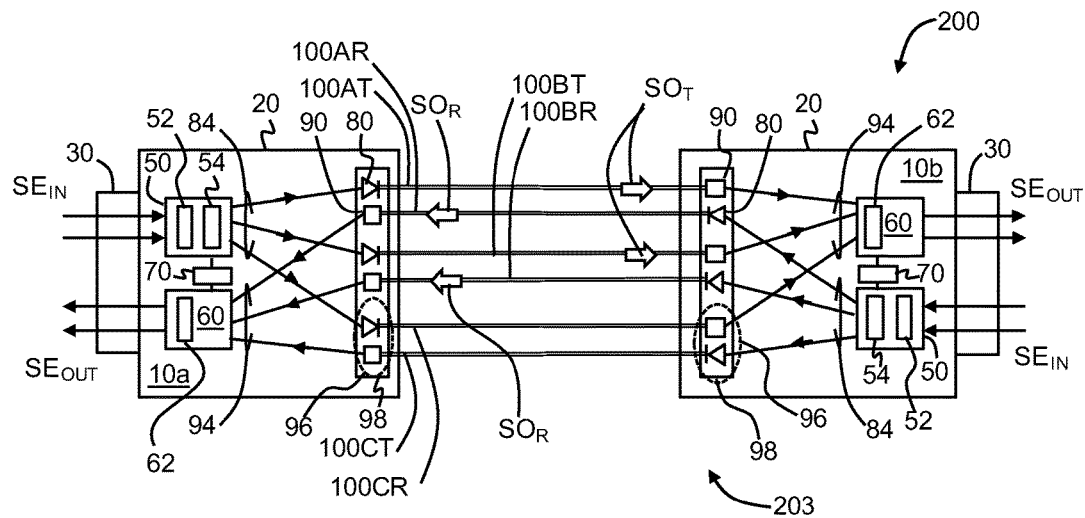
FIGS. 5A and 5B are schematic diagrams of example data communication systems similar to that disclosed in FIG. 4 and that show more details of the E-O interface devices and the optical signals that travel over the primary communication pathway in the initial configuration.

FIG. 5A is a schematic diagram of an example data communication system 200 that employs the E-O interface devices 10a and 10b of FIG. 1A for ease of illustration, and that includes the following properties: N=M=2, i.e., 2 input electrical signals $SE_{IN}$ and 2 output electrical signals $SE_{OUT}$ at each E-O interface device 10a and 10b, and P=Q=1 secondary optical fiber 100 associated with each E-O interface device 10a and 10b. Each E-O interface device 10a and 10b includes two switch units 50 and N+P=3 light sources 80 and 3 photodetectors 90, with the light sources and photodetectors arranged in the aforementioned transducer pairs 96 that form respective transducer arrays 98 in the two E-O interface devices 10a and 10b.

Figure 5B:
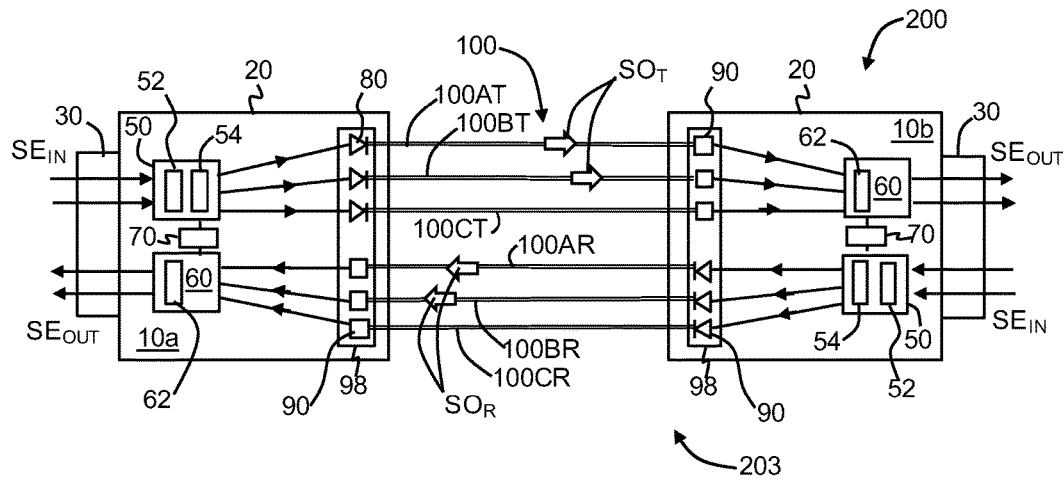

The data communication system of FIG. 5B is similar to that of FIG. 5A, but has the light sources and detectors arranged in groups rather than interleaved to form the transducer pairs 96 of FIG. 5A.

Figure 6A:
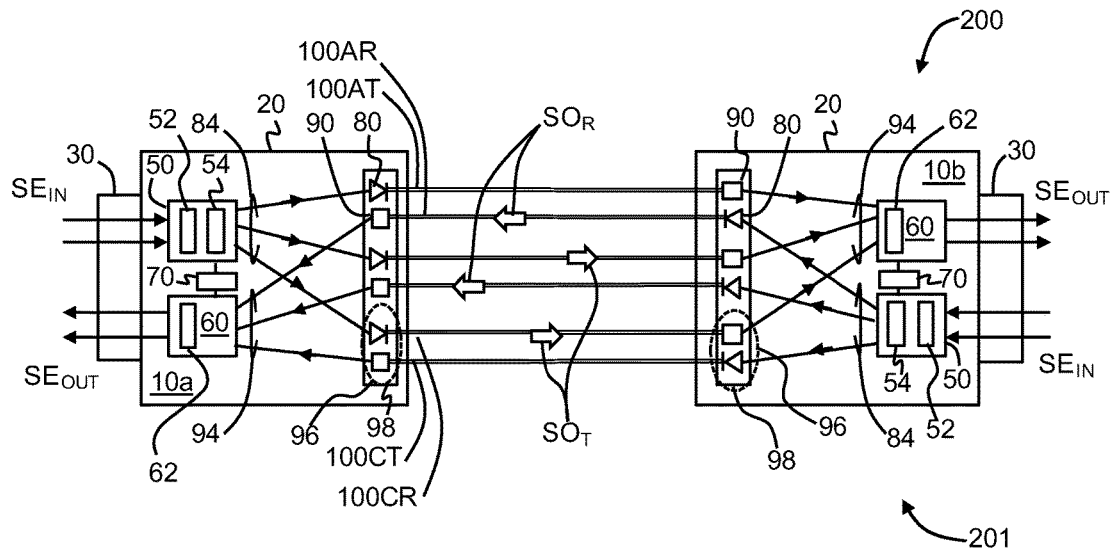
FIG. 6A and FIG. 6B are similar to FIGS. 5A and 5B, except that they illustrate an example where a transmit portion of the primary transmit pathway associated with the transmit optical fiber experiences a communication error so that the transmit optical signal is routed to the redundant transmit optical fiber.
Figure 6B:
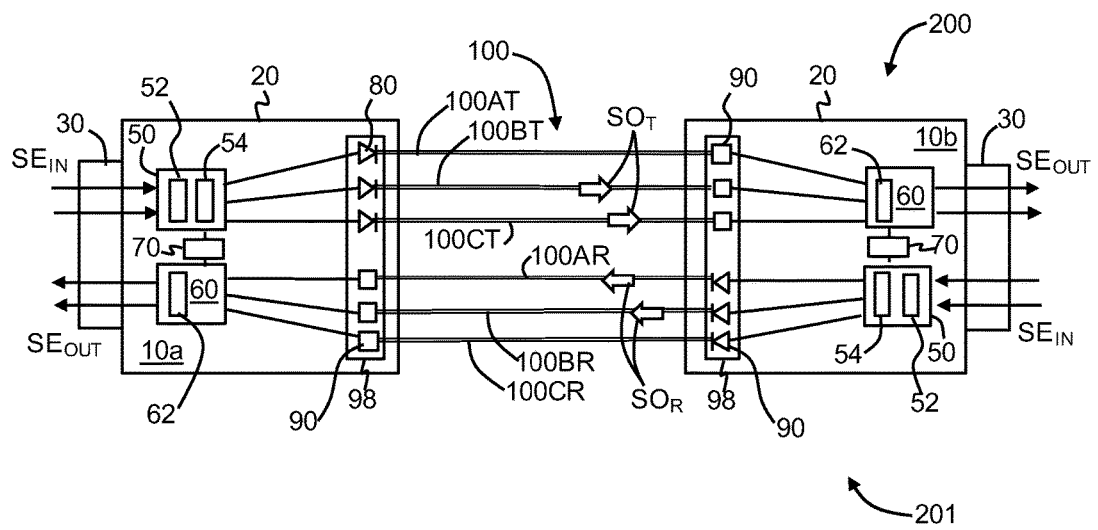

FIGS. 5A and 5B show examples of data communication system 200 in a first or normal operational state where data communication is functioning properly and is taking place over the primary transmit and receive pathways PT and PR respectively defined by transmit optical fibers 100AT, 100BT and receive optical fibers 100AR and 100BR. However, when there is a transmit communication error for example, data communication system 200 transitions to a second or redundant back-up operational state as shown in FIGS. 6A and 6B, wherein secondary transmit optical fiber 100CT (i.e., the secondary transmit pathway) is employed for the transmission of transmit optical signal $SO_T$.

Figure 7A:
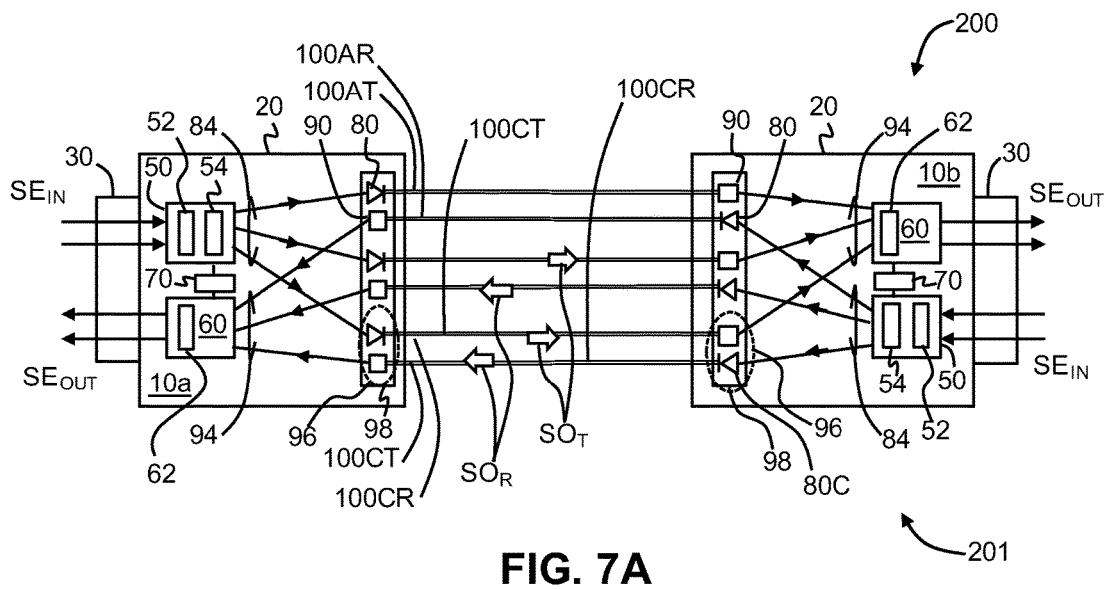
FIGS. 7A and 7B are similar to FIGS. 6A and 5B, except that they illustrate an example where a receive portion of the primary receive pathway associated with the receive optical fiber experiences a communication error so that the receive optical signal is routed to the redundant receive optical fiber.
Figure 7B:
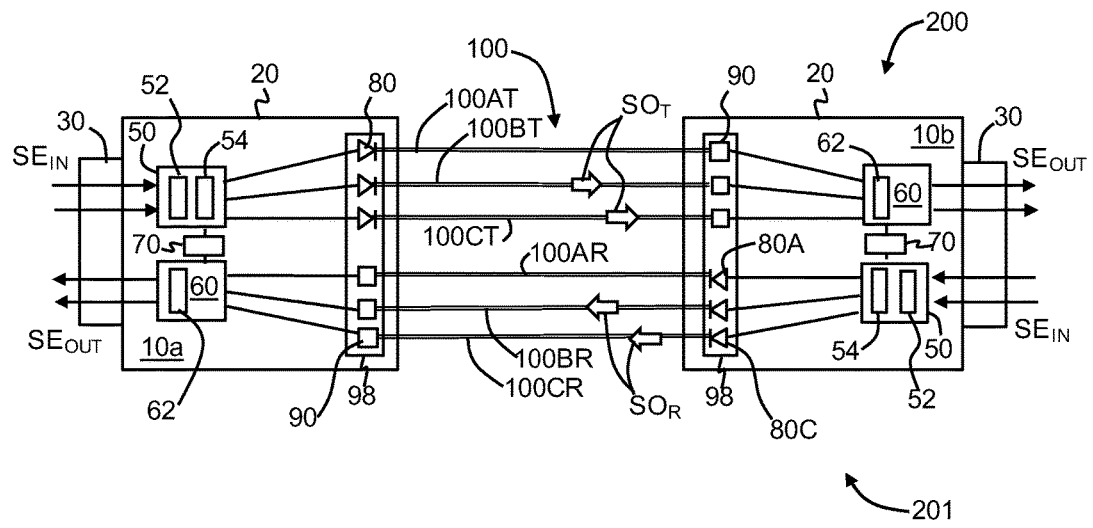

If for some reason there is also a communication error related to the receive optical signal $SO_R$, then the operational state of data communication system 200 switches again to that shown in FIGS. 7A and 7B, wherein now the receive optical signal $SO_R$ is directed to travel over secondary receive optical fiber 100CR, i.e., secondary receive pathway SR. The different operational states of data communication system 200 are set using the methods described above wherein, when a communication error is detected, one or more of the controllers 70 of the respective E-O interface devices 10a and 10b is/are prompted (e.g., via a communication error signal) to reconfigure the corresponding switch 54 in switch unit 50 as described above in order to maintain data communication. Note that in the case of FIGS. 7A and 7B, the controller 70 of the receive E-O interface device 10b is used to reconfigure switch 54 therein so that the corresponding light source 80 (namely, 80C) is activated rather than the original light source 80 (namely, 80A).

The systems and methods of the E-O interface devices 10 and data communication systems 200 disclosed are especially useful in relatively harsh operating environments, such as transportation and industrial environments, e.g., motor vehicles, heavy equipment, trucks, trains and airplanes. In particular, the E-O interface devices 10 and data communication systems 200 can be used to establish data communication between two or more external devices 210, such as cameras, processors, sensors, controllers, computers, actuators and displays, for example. The systems and methods provide high bandwidth to support data-intensive applications such as safety systems and entertainment while also providing a combination of high reliability, light weight and low cost.

Figure 8:
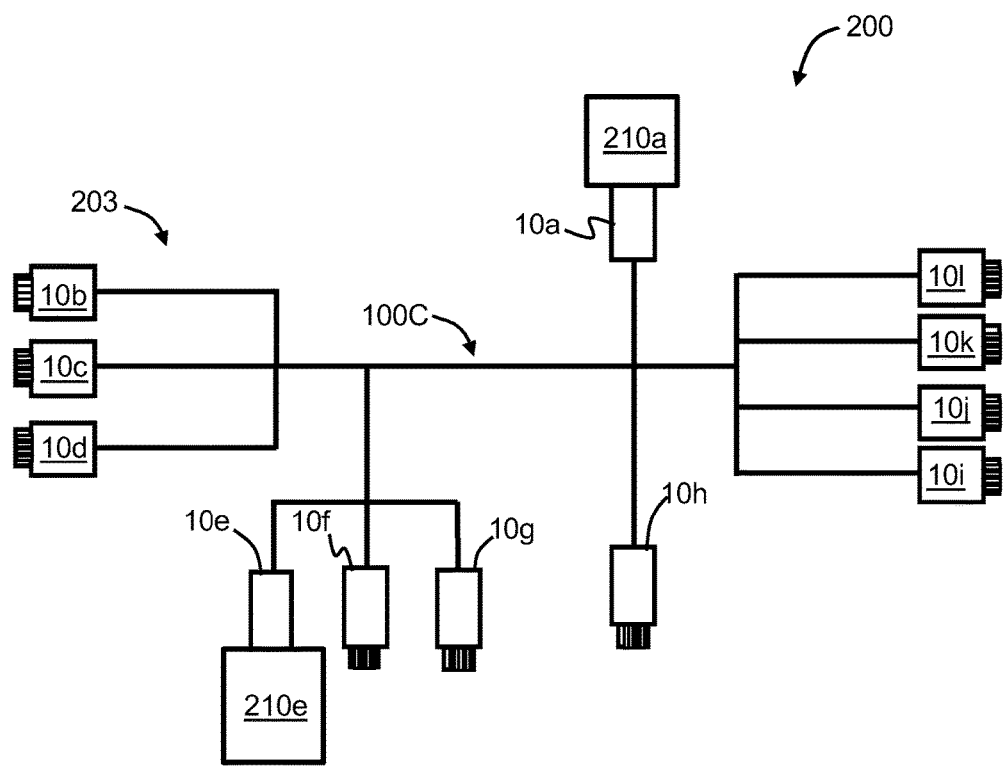
FIG. 8 is a schematic diagram of a data communication system that includes a network of E-O interfaces devices operably interconnected by an optical fiber cable that carries the optical fibers, wherein the E-O interface devices and the optical fibers define a harness.

FIG. 8 is a schematic diagram of a data communication system that includes a network of E-O interfaces devices 10a through 10h operably interconnected by an optical fiber cable 100C that carries optical fibers 100. Two external devices 210a and 210e are shown by way of example as being electrically connected to E-O interface devices 10a and 10e. Other external devices 210 can be connected to the other E-O interface devices. The E-O interface devices 10a through 10h and the optical fiber cable 100C that optically interconnects the E-O interface devices define an example of harness 203.

The logical interconnections of harness 203 can be defined and managed on point-to-point bases, i.e. between a particular pair of E-O interface devices 10. If the same data is transmitted from one source to multiple endpoints, a broadcast function can be provided electronically rather than optically. These may be combined or overlaid for handling and installation ease in a way that produces a complex or multi-element harness 203 with connections such as shown in FIG. 8. For example, E-O interface device 10a may be optically connected to E-O interface devices 10b and 10f. These connections can be managed and described as two separate point-to-point links even though the E-O interface devices 10b and 101 may also maintain point-to-point links with other E-O interface devices.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of performing data communication between first and second external devices that process electrical signals provided thereto, comprising:
   a) optically connecting the first and second external devices to respective first and second electrical-optical (E-O) interface devices, which are optical connected by primary optical communication pathway and a secondary optical communication pathway that are substantially co-routed;
   b) communicating between the first and second external devices by sending optical signals between the first and second E-O interface devices in both directions over the primary optical communication pathway only;
   c) performing an initial communication of the optical signals as test signals and comparing the communication of the test signals to at least one reference value to determine whether or not a communication error occurs, and when the communication error occurs, detecting the communication error at one of the first and second E-O interface devices and generating in response a communication error signal; and
   d) based on the communication error signal, at least one of the first and second E-O interface devices automatically reconfiguring itself so that the some or all of the electrical signal provided to at least one of the first and second external devices are derived from the optical signals transmitted or received over one or more secondary optical communication pathways.

2. The method according to claim 1, including forming the optical signals first as test signals and then forming the optical signals as data signals.

3. The method according to claim 1, including detecting the communication error at one of the first and second E-O interface devices and transmitting the communication error signal to the other of the first and second E-O interface devices.

4. The method according to claim 3, wherein the communication error signal is communicated over either at least one: the primary optical communication pathway, the secondary optical communication pathway, and an electrical communication pathway that is substantially co-routed with the primary and secondary optical communication pathways.

5. The method according to claim 4, wherein the communication error signal is communicated using out-of-band optical signaling.

6. The method according to claim 1, wherein the primary optical communication pathway includes one or more primary optical fibers and wherein the secondary optical communication pathway includes one or more secondary optical fibers.

7. The method according to claim 1, wherein the at least one of the first and second E-O interface devices automatically reconfiguring itself includes:
a controller receiving the communication error signal and in response causing an electrical switch electrically connected thereto to divert an electrical signal that originally travels to a primary light source to instead travel to a secondary light source.

8. The method according to claim 1, further comprising:
if the communication error has not yet occurred, performing a communication between the first and second E-O interfaces devices to allow the transmission of the optical signals as data signals over the primary optical communication pathway according to act b) until the communication error occurs, and including deriving the optical data signals from electrical data signals from one of the first and second external devices.

9. The method according to claim 8, wherein the act of performing the communication to allow the transmission of the optical signals as data signals is carried out over at least one of: i) the primary optical communication pathway, ii) the secondary optical communication pathway and ii) an electrical communication pathway that is that is substantially co-routed with the primary and secondary optical communication pathways.

10. A method of performing data communication between first and second external devices respectively connected to first and second electrical-optical (E-O) interface devices, comprising:
a) activating a primary light source on the first E-O interface device to transmit first optical signals over a primary transmit optical fiber that optically connects the primary light source to a primary photodetector at the second E-O interface device;
b) activating at least one secondary light source on the first E-O interface device to transmit second optical signals over a secondary transmit optical fiber that optically connects the secondary light source to a secondary photodetector at the second E-O interface device, wherein the first and second optical signals are substantially identical and carry substantially identical information;
c) converting the first optical signals into corresponding first electrical signals at the second E-O interface device, and providing first electrical signals to the second external device;
d) performing an initial communication of the first optical signals as test signals and comparing the communication of the test signals to at least one reference value to determine whether or not a communication error occurs; and
e) when the communication error occurs, the second E-O interface device automatically reconfiguring itself to convert the second optical signals into corresponding second electrical signals that are substantially identical to the first electrical signals and providing the second electrical signals to the second external device.

11. The method according to claim 10, wherein the first and second optical signals are data signals.

12. The method according to claim 10, wherein the first and second optical signals are test signals designed to establish optical communication over either the primary transmit optical fiber or over both the primary and secondary transmit optical fibers prior to transmitting the first and second optical signals as data signals.

13. An electrical-optical (E-O) interface device for transmitting data between a first external device and second external device over transmit optical fibers, comprising:
a primary light source optically coupled to a primary one of the transmit optical fibers and configured to generate, from an electrical signal from the first external device, primary optical signals for transmission over the primary transmit optical fiber;
a secondary light source optically coupled a secondary one of the transmit optical fibers and configured to generate from the electrical signal secondary optical signals for transmission over the secondary transmit optical fiber;
an electrical switch electrically connected to the primary and secondary light sources;
a controller electrically connected to the electrical switch; and
wherein the controller is configured to receive information about a transmission error of the primary output signals from another E-O interface device through an electrical link electrically connecting the E-O interface device and the another E-O interface device and set the electrical switch to activate the secondary light source to transmit the secondary optical signals based upon the information about the transmission error of the primary optical signals.

14. The E-O interface device according to claim 13, wherein the primary and secondary light sources are respectively electrically connected to primary and secondary light-source drivers, and wherein the electrical switch can direct an electrical signal to either the primary light-source driver or the secondary light source driver.

15. The E-O interface device according to claim 13, wherein the primary and secondary optical signals are either data signals or test signals.

16. The E-O interface device according to claim 13, wherein the electrical signal is an input electrical data signal and wherein primary and secondary optical signals are data signals generated from the input electrical data signal.

17. The E-O interface device according to claim 13, further comprising a primary photodetector and a secondary photodetector, and wherein the E-O interface device can operate as both a transmitter of the primary and secondary optical signals and a receiver of other primary and secondary optical signals sent by another E-O interface device.

18. A data communication system, comprising:
a first E-O interface device according to claim 13 and electrically connected to the first external device; and
a second E-O interface device electrically connected to the second external device and optically coupled to the first E-O interface device by the primary and secondary transmit optical fibers, the second E-O interface device configured with primary and secondary photodetectors respectively arranged to receive and convert the primary and secondary optical signals into primary and secondary electrical signals for processing by the second external device.

19. The data communication system according to claim 18, wherein the primary and secondary transmit optical fibers are substantially co-routed.

20. The data communication system according to claim 18, further comprising an electrical link that electrically connects the first and second E-O interface devices, wherein the electrical link is substantially co-routed with at least one of the primary and secondary transmit optical fibers.

21. An electrical-optical (E-O) interface device for receiving primary optical signals and secondary optical signals over respective primary and secondary receive optical fibers, comprising:
- a primary photodetector optically coupled to the primary receive optical fiber and configured to receive the primary optical signals and generate therefrom primary electrical signals;
- a secondary photodetector optically coupled a secondary one of the receive optical fibers and configured to receive secondary optical signals and generate therefrom secondary electrical signals, respectively;
- a multiplexer unit electrically connected to primary and secondary photodetectors and that is configured to receive the primary and secondary optical signals;
- a controller electrically connected to the multiplexer unit; and
- wherein the primary and secondary optical signals are substantially identical and wherein the secondary optical signals are received when the primary optical signals are no longer received due to a receive error relating to the primary optical signals, and wherein the controller is configured to set the multiplexer unit to initially receive the primary optical signals as test signals, compare the test signals to at least one reference value to determine whether or not a communication error occurs, and then set the multiplexer unit to receive and direct the secondary signals to the first external device when the communication error occurs.

22. The E-O interface device according to claim 21, wherein the controller is electrically connected to another E-O interface device that also includes a controller, and wherein information about the receive error is communicated between the E-O interface device controllers via at least one of: a transmit optical fiber, the primary receive optical fiber, the secondary receive optical fiber, and an electrical link.

23. A data communication system, comprising:
- a first E-O interface device according to claim 21 and electrically connected to the first external device; and
- a second E-O interface device electrically connected to the second external device and optically coupled to the first E-O interface device by the primary and secondary receive optical fibers, the second E-O interface device configured to receive from the first external device first electrical signals and generate therefrom the primary and secondary optical signals.

24. The data communication system according to claim 23, wherein the primary and secondary receive optical fibers are contained in an optical fiber cable.

25. The data communication system according to claim 23, further comprising an electrical pathway between the first and second E-O interface devices, wherein the electrical pathway is substantially co-routed with the primary and secondary receive optical fibers.

* * * * *

UNITED STATES PATENT AND TRADEMARK OFFICE
CERTIFICATE OF CORRECTION

PATENT NO. : 10,148,348 B2
APPLICATION NO. : 15/206846
DATED : December 4, 2018
INVENTOR(S) : Michael John Yadlowsky Page 1 of 1

It is certified that error appears in the above-identified patent and that said Letters Patent is hereby corrected as shown below:

In the Claims

In Column 19, Line 34, Claim 9, delete "ii)" and insert -- iii) --, therefor.

In Column 19, Line 35, Claim 9, delete "that is that is" and insert -- that is --, therefor.

Signed and Sealed this
Twenty-ninth Day of December, 2020

Andrei Iancu
*Director of the United States Patent and Trademark Office*